Patented May 3, 1938

2,115,700

UNITED STATES PATENT OFFICE 2,115,700

ESTERS OF POLYGLYCOLS AND THEIR ETHERS AND COMPOSITIONS CONTAINING THE SAME

Bjorn Andersen, Maplewood, and Amerigo F. Caprio, Newark, N. J., assignors to Celluloid Corporation, a corporation of New Jersey No Drawing. Application April 26, 1933, Serial No. 668,078

2 Claims. (Cl. 106—40)

This invention relates to new esters of polyglycols or their partial ethers and to the preparation of compositions containing derivatives of cellulose containing such esters of polyglycols or their partial ethers as plasticizers or softening agents.

An object of our invention is to prepare new esters of polyglycols or their partial ethers. A further object of our invention is to prepare compositions, such as plastic or liquid coating compositions, containing derivatives of cellulose wherein an ester of a polyglycol or of its partial ether is employed as a plasticizer. Other objects of our invention will appear from the following detailed description.

We have found that esters of polyglycols or of their partial ethers are capable of forming solutions with derivatives of cellulose and are excellent solvents, swelling agents, plasticizers, softening agents, or camphor substitutes for use in conjunction with derivatives of cellulose to impart softness, pliability and other desirable properties to plastics, films, textiles, and other materials containing derivatives of cellulose.

In accordance with our invention, we prepare new esters of polyglycols or of their partial ethers by any suitable method and further in accordance with our invention we prepare compositions containing derivatives of cellulose and an ester of a polyglycol or of its partial ether as plasticizer or softening agent.

The polyglycol employed for making the esters embraced within this invention may be any suitable one, such as:

Diethylene glycol OH.CH$_2$CH$_2$.O.CH$_2$CH$_2$OH

Triethylene glycol OH.CH$_2$CH$_2$.O.CH$_2$CH$_2$OCH$_2$.CH$_2$OH

Tetraethylene glycol [OH(CH$_2$)$_2$O(CH$_2$)$_2$]$_2$O

Pentaethylene glycol [OH.CH$_2$CH$_2$.O.CH$_2$CH$_2$.O.CH$_2$CH$_2$.O.CH$_2$CH$_2$.O.CH$_2$CH$_2$.OH]

Hexaethylene glycol [OH(CH$_2$)$_2$O(CH$_2$)$_2$O(CH$_2$)$_2$]$_2$O

The partial ethers of the polyglycols employed for making the esters forming the subject matter of this invention may be formed by replacement of a hydrogen atom of a hydroxy group by methyl, ethyl, propyl or other alkyl group, phenyl or other aryl group or benzyl or other aralkyl group. An example of such partial ether of a polyglycol is the methyl ether of diethylene glycol, CH$_3$O(CH$_2$)$_2$O(CH$_2$)$_2$OH.

The acid radicle of the ester of the polyglycol or its partial ether may be any suitable one but is preferably an aliphatic or aromatic carboxylic acid. Such acid may be monobasic, such as benzoic acid, naphthoic acid, propionic acid, butyric acid, lactic acid, hydroxy butyric acid or stearic acid or it may be di- or poly-basic such as phthalic acid, malonic acid, succinic acid, tartaric acid, citric acid or trimesic acid. The acid employed for making the ester should contain three or more carbon atoms, since the esters of acids containing less than three carbon atoms are too volatile for use in our invention.

If a monobasic acid and a partial ether or a partial ester of a polyglycol are combined to form the ester, the resulting product may be represented by the formula

RCOOR' wherein R is an aliphatic or aromatic residue and R' is the residue of a partial ether or ester of a polyglycol. An example of such ester is the benzoate of the methyl ether of diethylene glycol

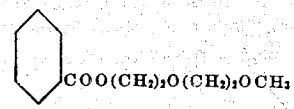

On the other hand an ester may be formed by causing one molecule of a polyglycol to combine with two molecules of the same or different monobasic acids. Examples of such resulting products are diethylene glycol di-benzoate.

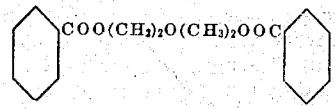

and diethylene glycol benzoate-acetate

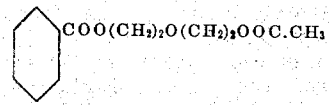

If a polybasic acid is employed in making the ester, one or more of the carboxylic hydrogens thereof may be replaced by the residue of a polyglycol or its partial ether or ester, while any remaining carboxylic hydrogens may be replaced by any other desired groups such as methyl, ethyl or other alkyl group, the residues of simple glycols or their partial ethers, such as mono methyl glycol, aromatic groups, etc.

An example of an ester of a polyglycol and a polybasic acid is diethylene glycol phthalate

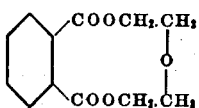

An example of a mixed ester of a polybasic acid with a partial ether of a polyglycol and another group is monomethyl diethylene glycol methyl phthalate

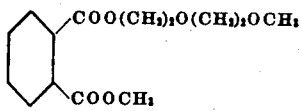

An example of a mixed ester of a polybasic acid with a partial ester of a polyglycol and another group is diethylene glycol-mono acetate-methyl phthalate

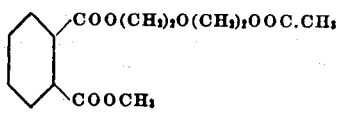

An example of an ester of a polybasic acid wherein all carboxylic hydrogens are replaced by the residue of a partial ether of a polyglycol is di-monomethyl diethylene glycol phthalate

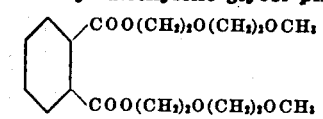

An example of an ester of a polybasic acid wherein at least one carboxylic hydrogen is replaced by the residue of a partial ether of a polyglycol while another carboxylic hydrogen is replaced by the residue of a partial ester of a polyglycol is monomethyl diethylene glycol diethylene glycol monoacetate phthalate

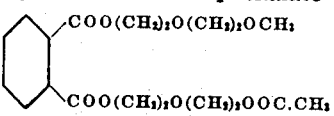

Any suitable method may be employed for making the esters of the polyglycols or their partial ethers. Thus the anhydrides or the chlorides of the desired acid may be caused to react with the polyglycol or its partial ether or ester. Alternatively the desired acid, or, in case of the making of the mixed esters of polybasic acids, the partial esters of such polybasic acid, may be caused to react by heating with the polyglycol or its partial ether or ester, in the presence of a catalyst or condensing agent such as sulfuric acid Any suitable derivative of cellulose may be employed in conjunction with the esters of polyglycols or their partial ethers, such as cellulose nitrate but we prefer to employ organic derivatives of cellulose, such as organic esters of cellulose or cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose.

Plastic compositions containing the derivative of cellulose and the esters of polyglycols or their ethers may be made in any suitable manner and they may be worked up into sheets, rods, tubes, blocks or any other desired shape. Molding powder containing the derivative of cellulose and the ester of polyglycols or their partial ethers in intimate association but containing little or no solvent may be made, and these powders may be molded under heat and pressure to any desired shape. Filaments, yarns and other textile materials may be made from solutions containing the organic derivatives of cellulose and the ester of polyglycols or their partial ethers by extrusion through orifices into an evaporative atmosphere, as in dry spinning, or into a precipitating bath as in wet spinning.

Solutions of the organic derivative of cellulose and the esters of polyglycols or their partial ethers in a volatile solvent may be cast or extruded onto a smooth surface and the volatile solvent permitted to evaporate to form films that may be used for photographic or other purposes. Another application of this invention is in the preparation of laminated glass wherein a plastic sheet containing the derivative of cellulose and the ester of the polyglycol or its partial ether is interposed between sheets of glass. Coating compositions such as lacquers may be formed containing the derivative of cellulose and the ester of the polyglycol or its partial ether dissolved in appropriate solvent mixtures, and resins, either synthetic or natural, compatible with the derivative of cellulose may be added thereto.

The proportion of the ester of the polyglycol or its partial ether to the derivative of cellulose may be varied in accordance with the particular requirements. Generally we have found that in the case of its use with cellulose acetate, the ester of the polyglycol or its partial ether may be employed in amounts of 10% or less to 60% or more of the weight of the cellulose acetate.

In making the compositions in accordance with our invention, the ester of the polyglycol or its ether may be employed as the sole plastifying agent, or it may be used in conjunction with other plastifiers such as triacetine, dibenzyl tartrate, diethyl tartrate, dibutyl tartrate, diethyl phthalate, the phthalate of the mono methyl ether of ethylene glycol, etc.

In making these compositions, solvents of appropriate nature, such as acetone, methyl acetate, ethylene formal, ethyl lactate, formal glycerol, diacetone alcohol, of varying boiling points may be used to suit the particular requirements. Effect materials such as pigments, filling materials or dyes may be added to produce any desired effect.

It is to be understood that the foregoing detailed description is given merely by way of illustration, and that many variations may be made therein without departing from the spirit of our invention.

Having described our invention, what we claim and desire to secure by Letters Patent is:

1. A composition of matter containing a derivative of cellulose and an ester of a partial alkyl ether of polyglycol with a hydroxy acid selected from the group consisting of lactic, hydroxy butyric, tartaric and citric acids.

2. A composition of matter containing a derivative of cellulose and an ester of a partial alkyl ether of diethylene glycol with a hydroxy acid selected from the group consisting of lactic, hydroxy butyric, tartaric and citric acids.

BJORN ANDERSEN.
AMERIGO F. CAPRIO.